June 11, 1929.  G. W. BELL  1,717,000
ANTIVIBRATION DEVICES FOR AUTOMOBILES
Filed March 24, 1925   3 Sheets-Sheet 1
Fig. I.
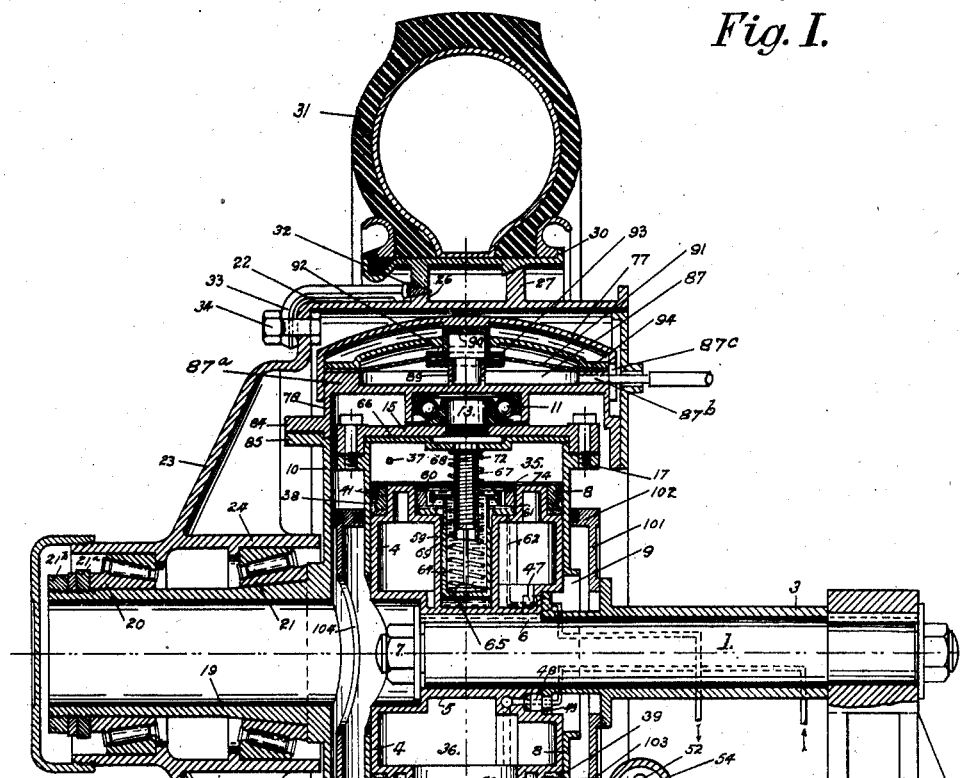
Fig. I^A.
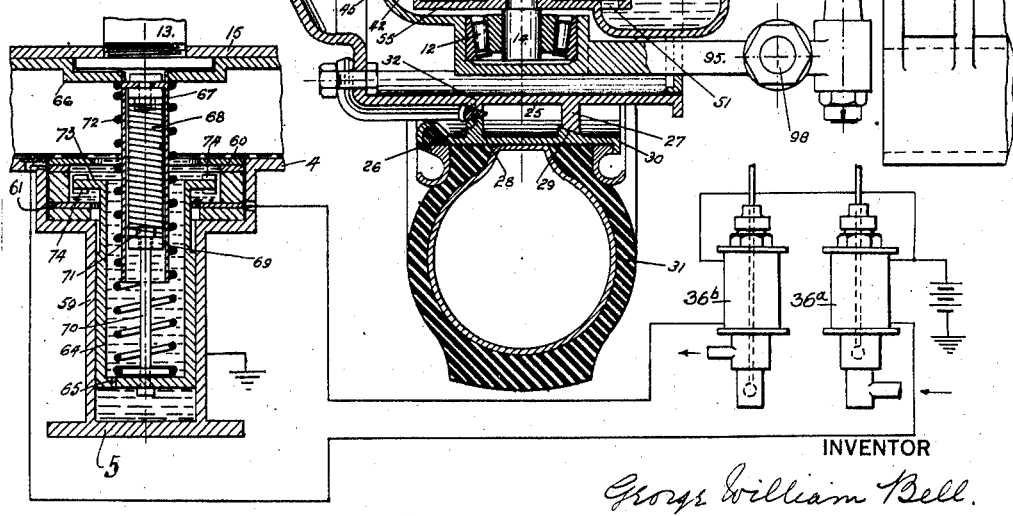
INVENTOR
George William Bell.

June 11, 1929. G. W. BELL 1,717,000
ANTIVIBRATION DEVICES FOR AUTOMOBILES
Filed March 24, 1925 3 Sheets-Sheet 3

INVENTOR
George William Bell.

Patented June 11, 1929.

1,717,000

UNITED STATES PATENT OFFICE.

GEORGE WILLIAM BELL, OF DETROIT, MICHIGAN.

ANTIVIBRATION DEVICE FOR AUTOMOBILES.

Application filed March 24, 1925. Serial No. 18,066.

This invention relates to pneumatic antivibration devices of the piston and cylinder type as applied between the wheels and axles of automobiles and like vehicles, but more particularly to that type disposed in the hub or plane of the wheel, as shown fully and set forth in my prior Patents No. 1,289,041, dated December 24, 1918, and No. 1,353,886, dated September 28, 1920, and has for its object improvements connected therewith in the method and means of steering and braking the wheels equipped with the said devices, and also improving the means of mounting the wheel on the cylinder of the respective devices and also improving the means fully described and set forth in my prior Patent No. 1,288,475, dated December 24, 1918, of automatically controlling the volume and pressure of air in the device in accordance with the requirements of the load supported respectively thereon.

To improve and facilitate the steering of vehicles fitted with wheels containing the said suspension devices, particularly those vehicles of the heavier type, viz, busses and trucks, the invention provides means for pivoting and steering the said wheels substantially in the central vertical plane thereof, thereby reducing the turning moment or resistance, and it further provides means of applying brakes to the steering wheels, and that in a manner to insure a minimum of stresses and unsprung weight in the wheel and parts attached thereto, and a maximum of braking surface or area. It further provides a method of mounting the wheel on the cylinder of the device and permits of its removal from the bearings as a unit endwise from the axle without disturbing the suspension device attached thereto, thereby affording access to the brake parts, etc. This arrangement when the wheel is mounted in its normal position, permits access to the chambers of the cylinder carrying the device for replacement of the oil contained therein at all times. It also permits of the inside of the hub proper being utilized as a brake drum the outside periphery being adapted to receive a demountable rim and tire or tires. Furthermore, the invention provides an improvement of the control switch which is actuated by the relative movement of the wheel and axle, as fully set forth and described in my prior Patent No. 1,288,475, dated December 24, 1918, which controls the supply of electricity from its source to actuate the control air valves. This improved arrangement insures a more accurate and sensitive control of the air pressure in the device to conform to the varying requirements of the load supported thereby and is so disposed in regards to the parts of the device as to simplify the manufacture and assembly and also provides protection from the road dust and abuse.

I will further describe my invention with the aid of the accompanying sheets of explanatory drawings in which:—

Fig. 1 is a vertical cross section of a pneumatic device of the piston and cylinder type disposed in the hub and plane of the front steering wheel of a heavy type automobile showing the arrangement of mounting, steering, and braking the same.

Fig. 1^A shows in detail the switch means shown and disposed in the check spring chamber of the cylinder of the device.

Figure 2:
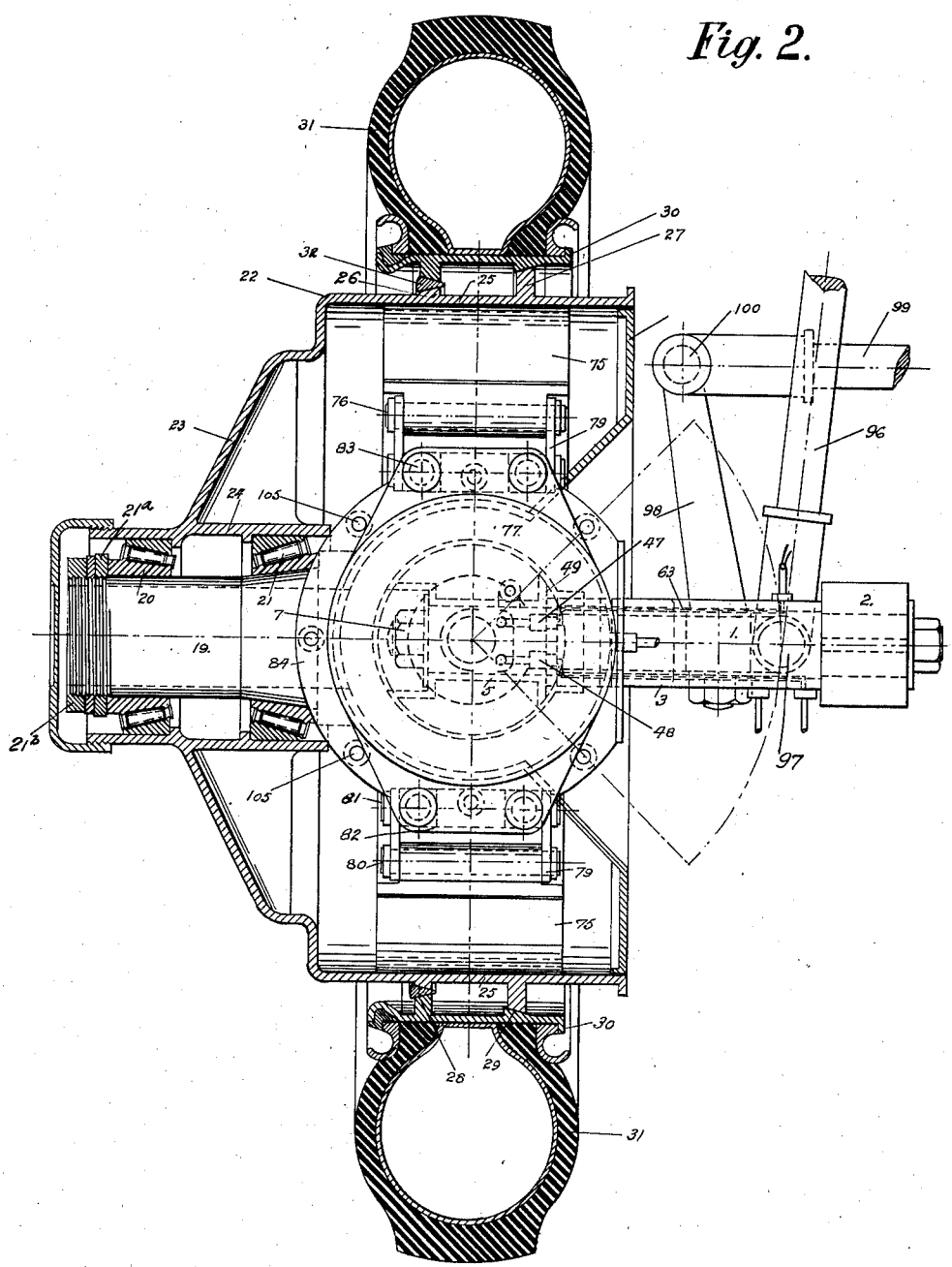
Fig. 2, is a plan of Fig. 1, showing the device and brake parts attached thereto in elevation and the wheel, bearings, rim and tire in section.
Figure 3:
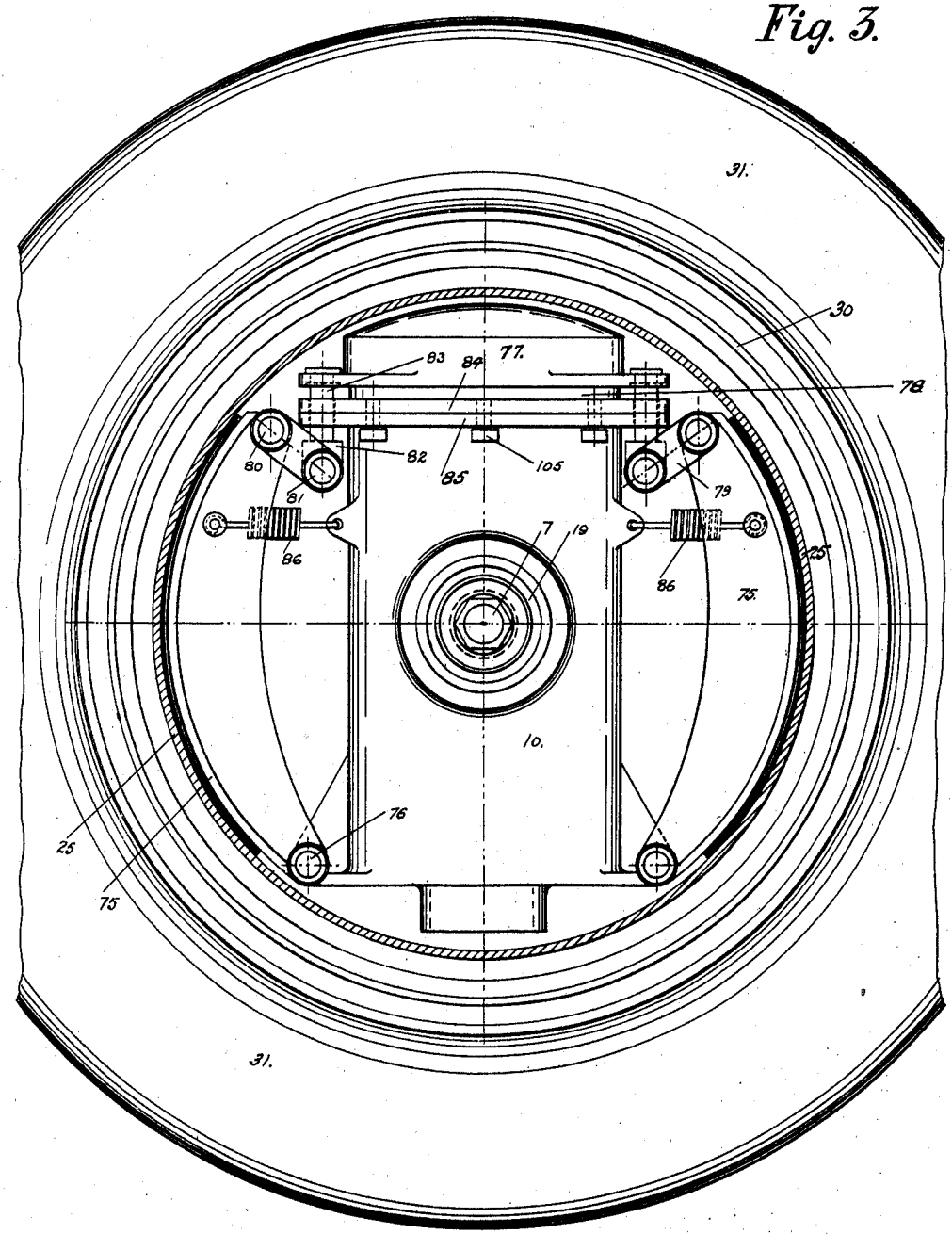
Fig. 3 is a view partly in longitudinal section and partly in elevation on a vertical plane of Fig. 1.

Referring first to the means for steering the wheels containing the said devices of the type shown in Figures 1, 1^A, 2, and 3, of the drawings, the stub axle 1 is detachably secured to the dropped axle 2, and is provided with a sleeve 3 extending between the latter and the piston 4 which is mounted in a vertical plane on the stub axle 1 through a cross boss 5 formed therein, the piston being secured and held from turning by the key 6 and nut 7. The cylinder 8 operates with the piston 4 and has a hollow inner arm 9 adapted to envelope the stub axle 1 and be guided thereon and permitting a predetermined vertical displacement.

Enveloping the outer portion of the cylinder 8 the yoke 10 is arranged and adapted to turn horizontally and be carried by bearings 11 and 12 disposed on the vertical centre pins 13 and 14 respectively, secured and carried by the top and bottom cylinder caps 15 and 16 which close the cylinder ends and are secured thereto by bolts through the flanges 17 and 18 respectively.

Attached to the central part of the yoke 10 the hollow arm 19 outwardly extends and carries on its outer periphery the bearings 20 and 21, on which the wheel hub 24 and parts are mounted and revolve; the bearings and wheel being secured endwise on the arm 19 by the threaded nuts 21ª and lock nut 21ᵇ. The opening in the arm 19 affords access to the nut 7 to secure the piston 4 and device endwise on the axle 1.

The wheel comprises a drum or barrel portion 22 open at its inner face and closed by a vertical disc portion 23 attached to the bearing hub 24 at its outer face, and adapted to pass over the suspension device when being mounted endwise on the bearing arm 19. The central portion of the inner face of the wheel forms the brake drum 25, the outer periphery having radial extending ribs 26 and 27 with bevelled outer edges 28 and 29 adapted to engage with a conventional type of demountable pneumatic tire rim 30, carrying the tire 31 and disposed in the central plane of the wheel and held in position by the usual wedge ring 32, lugs 33, and nuts 34; sufficient space being allowed between the outer periphery of the drum 22 and the inner face of the rim 30, to permit accommodation of the tire stem and air valve and allow for the dissipation of the heat from the brake drum 25.

Referring to the suspension device, air chambers 35 and 36 are formed in the cylinder 8, one above and one below the axle 1. Piston 4 engages in these chambers and co-operates therewith to form two air cushions the one below the axle which is formed by the space inside the piston 4 and the lower part of the cylinder 8 forming the air cushion or air spring which yieldingly supports the weight upon the wheels, and the other operating as a dashpot or check spring to check the vertical play of the cylinder 8 and the wheel supported thereon. The dashpot 35 communicates with the atmosphere under the control of the piston 4 through vent holes or ports 37 in the wall of the cylinder 8.

The upper and lower ends of the piston 4 are provided with suitable cup leather packing rings 38, 39, and 40 secured and held in position by the threaded rings 41, and 42 on the piston 4. Between the lower cup leather packing rings 39 and 40, a felt wiper ring 43 and a groove 44 in communication with the chamber 45 is provided, to gather and trap any oil that may pass the lower cup leather packing ring 40.

Air is supplied to the device from the air control inlet valve 36ª from the source of supply, through a conduit disposed in and passing through the axle sleeve 3 and passages formed in the piston 4 to the chamber 45 and through a check valve 46 disposed in a passage in the lower part thereof to the air chamber 36, thereby forcing and returning any oil in the chamber 45 to the air chamber 36 of the device.

To reduce the pressure of air in the device, air is discharged from the upper part of the chamber 36 in the piston 4 through a passage formed in the wall of the latter which connects with the air control outlet valve 36ᵇ, through a conduit disposed in the sleeve 3 of the axle communicating therewith and the atmosphere.

Both the air inlet and outlet conduits disposed in the axle sleeve 3 connect with the respective passages in the piston 4, by packed glands 47 and 48 disposed in the counterbore 49 of the piston 4 and are made airtight automatically by the pressure exerted between the face of the sleeve 3 and the piston 4 with the securing of the latter endwise on the axle 1 by the nut 7 attached thereto.

The air chamber 36 of the device is connected to the chamber 50 formed on the side of the cap 16 by the passage 51 and is disposed on the inner face of the cylinder 8 of the device, and is therefore accessible at all times from the inside of the wheel; it is provided with an opening 52 to permit of replenishment of oil to the air chamber 36 of the device, the level of the opening being arranged so that the correct level and quantity of oil required in the chamber for sealing and lubricating the piston packing cup leather ring 40 is insured when the oil overflows at the filling opening. A plug closes the opening and seals a space 54 containing air.

A ferrule 55 is formed in the lower cap 16 and is adapted to telescope with the opening 56 in the lower face of the piston 4, cutting off the communication between the annular space 57 formed between the cylinder wall 8 and the ferrule 55, from the air chamber 36. The space 57 with the chamber 50 forms an oil and air dashpot arranged so that when the piston 4 in the cylinder 8 of the device approaches the end of its displacement and engages with the ferrule 55, the oil in the annular space 57 will be forced to pass between the ferrule and opening 56 in the piston, and also into the chamber 50 through the passage 51 compressing the air contained therein, above the oil in the space 54 thereby cushioning the piston and preventing it striking the cylinder.

To control the supply of electricity from its source on the vehicle to the electromagnetically operated air control inlet and outlet valves respectively 36ª and 36ᵇ, by the relative movement of the cylinder 8 on the piston 4, for the purpose of maintaining the pressure of air in the device just sufficient to support the load thereon and maintain the piston 4 in its predetermined position of suspension in the cylinder 8 and in a state of equilibrium, I provide a switch control means disposed in the upper air check chamber 35, comprising a vertically disposed cylinder 59, the upper portion of which has an enlarged diameter which is adapted to receive two annularly disposed insulated ring terminals 60 and 61 respectively in electrical communication with the source of electricity and the air control inlet and outlet valves 36ª and 36ᵇ disposed on the vehicle, through electrical conduits carried through passages 62 formed in the piston 4, and 63 in the axle sleeve 3.

The terminals of the conductors disposed in the piston 4 and those in the sleeve 3 are respectively adapted to make, by spring means, electrical contact with each other in the counterbore face 49, of the piston 4, when the latter is mounted on and secured endwise in its position on the axle 1. The piston 64 operates in the cylinder 59 and is provided at the bottom with a small opening 65 adapted to permit oil, which fills the cylinder 59 and submerges the piston 64, to pass slowly from one side of the latter to the other side when it is moved up or down in the cylinder, thereby retarding or damping its movement.

The piston 64 is attached to the top of the cylinder 8 through a disc ring or spider 66 disposed between the cylinder 8 and the cap 15, at the centre of which a vertical guide tube 67 extends downwards into the cylinder 59. A tension spring 68 is disposed in and attached at its upper end to the upper part of the tube 67 and has at its lower end a collar 69 through which the connecting rod 70 passes and is adapted to slide therein. The rod 70 is connected at its lower end with the piston 64 and has at its upper end a head 71. The length of the rod 70 is such that when the piston 4 is in its normal position of suspension in the cylinder 8 of the device, the head 71 will be in engagement with the collar 69 of the spring, there being sufficient length of rod and spring to permit the former passing freely therein when the piston 4 of the device rises to the limit of its displacement upwards. Disposed round the guide tube 67 there is provided a compression spring 72 the free length of which is such as to engage with the upper end of the tube and be secured at its lower end to the piston 64, when the piston 4 is in its normal position of suspension in the cylinder 8 of the device.

The arrangement is such that when the piston 4 descends in the cylinder 8, the length of the guide tube 67 is sufficient to permit the compression spring 72 sliding thereon to the limit of the displacement downwards, and is yet short enough to permit the piston 4 rising to the limits of its displacement above its normal position of suspension without the tube coming in contact at any time with the piston 64.

The piston 64 has at its upper end a radially extending flange 73 with contact points 74 above and below the same, arranged so that when the piston 64 is moved upwards in the cylinder 59, electrical contact is made with the insulated terminal ring 60 secured to the piston 4, thereby grounding and closing the electrical circuit and energizing and opening the air inlet control valve 36ª to the supply of air to the device. Conversely, when the piston 64 is moved downwards the contact points 74 make electrical contact with the similar terminal ring 61 attached to the piston 4, thereby grounding the current and closing the electrical circuit to the air control outlet valve 36ᵇ permitting air to escape from the device to the atmosphere.

The air inlet control valve and air control outlet valve, above referred to are not shown in the accompanying drawings as they form per se no part of this invention but form part of my prior Patent No. 1,288,475 dated September 24, 1918, wherein they are fully shown and described. It will be obvious that in lieu of the switch piston 64 and cylinder 59, a diaphragm or metallic bellows or other mechanical equivalent may be substituted without departing from the spirit and scope of my invention.

Referring now to the disposition and arrangement of the brake parts, I provide brake shoes 75 adapted to engage with the brake drum 25, and be disposed in the centre plane of the cylinder 8 of the device and pivotally secured to the lower part of the yoke 10 by the bolts 76, and at the upper end to a vertically reciprocatable flanged cap 77, disposed on and guided by the upper part 78 of the yoke 10, by means of connecting links 79, bolts 80, and 81, crosshead 82, and guide pins 83 secured to the flanged cap 77, the said pins 83 being adapted to engage with and slide in the holes in the flanges 84 and 85 of the yoke parts. Springs 86 are secured respectively to the brake shoes and lugs on the yoke 10 to normally maintain the brake shoes free from the drum 25.

To operate the brakes a fluid pressure chamber 87 is formed in the upper part 78 of the yoke 10. The lower face of the chamber 87 carries one portion of the pivotal vertical bearing 11 on which it turns on the cylinder 8, and has on its upper face an outer rim or flange 87ª adapted to receive the outer edge of the flexible diaphragm 91 to which it is secured and made air tight by the flanged cover 94 and suitable bolts. A vertical guide 89 is provided and adapted to be in sliding engagement with a centrally disposed cylindrical guide element 90 having at its lower end a flange 92 and a threaded nut 93 screwed thereon, adapted to engage with the flexible diaphragm and make an air tight joint therewith.

An opening is provided in the chamber 87 through a vertical slot 87ᶜ in the cap 77 and is connected by suitable flexible conduit means and fittings to the air brake control valve and the source of air under pressure. When the control valve is operated by the driver and air is supplied to the chamber 87 the diaphragm 91 and cap 77 are raised thereby applying the brake shoes 75 to the surface of the drum 25 against the pressure of the springs 86. When the brake control valve is operated to release the brakes, air is allowed to escape from the chamber 87 to the atmosphere causing the cap 77 and diaphragm 91 to be forced downwards by the action of the springs 86 withdrawing the brake shoes 75 from the drum.

To steer and turn the wheel on the cylinder 8 of the device, I provide an arm 95 attached to the yoke 10 carrying the wheel at its lower end, adapted to turn the latter horizontally through the required degrees of angle of lock, by means of the drag link 96 which is attached to the ball pin 97 secured to the said yoke arm 95 and the steering parts disposed on the vehicle. An arm 98 attached to the yoke arm 95 is provided and adapted to engage with the cross connecting tube 99, connecting the two steering pistons by means of the universal joints 100 disposed thereon.

To maintain the openings in the cylinder 8 dust-free, I provide an annular cylindrical dust tube 101, split vertically into two parts and adapted to embrace the outside of the wall of the cylinder 8, and engage with the inside wall of the yoke 10 by means of the flanges 102 and 103, and be in vertical and horizontal sliding engagement therewith, means being provided to secure it firmly to the flange of the axle sleeve 3 when the piston 4 and cylinder 8 is mounted on the axle 1 as a unit, endwise. To make dust proof contact between the moving cylinder 8 and yoke 10 and the dust tube 101, flanges 102 and 103 are provided at the top and bottom edges having grooves filled with felt.

To permit the securing of the device endwise on the axle 1, an opening 104 is provided in the dust tube 101 giving access to the nut 7 on the axle 1 through the opening in the bearing arm when the wheel is in its normal position.

To assemble and afford access to the cylinder 8 of the device, the yoke 10 is made in two parts the upper part 78 being secured to the lower part by flanges 84 and 85 and stud bolts 105. Access is afforded to cylinder 8 through the detachable cap 15, affording means for inserting the piston 4 and the assembly of the switch piston 64 in its cylinder 59 together with the springs and carrier spider 66. The cap 15 is held air tight on the cylinder 8 by suitable packing between the flanges and stud bolts.

To assemble the device after the piston 4 is inserted in the cylinder 8 and the cap 15 attached, the dust tube 101 is secured in position round the cylinder 8. The cylinder 8 is then placed in the centre of the lower part of the yoke 10 thereby assembling the bearing 12. The top part 78 of the yoke 10 containing part of the bearing 11 is assembled over the same and secured to the lower part of the yoke by the flanges 84 and 85 and stud bolts.

The device as a unit now is passed endwise onto the end of the axle 1, the opening in the dust tube 101 being large enough to allow of it passing over the flange or end of the sleeve 3 and engaging the latter with the counterbore in the face of the piston 4, and automatically thereby connecting the air inlet and outlet conduits and the electrical connections; when it is secured in position endwise by the nut 7 accessible through the bearing arm.

The brake shoes 75 are then assembled in position on the yoke 10 and connected to the cap 77. The wheel and brake drum are then passed over the device and the hub of the same mounted on the bearings on the arm of the cylinder 8, and secured endwise thereon by the threaded ring 21$^a$ and washer 21$^b$.

Referring now to the operation of the air control switch disposed in the air check chamber 35 above described, when the load supported statically on the piston 4 of the device, is greater than the effective pressure of the air in the cylinder 8 thereof, the piston will be displaced downwards from its normal position of suspension, carrying with it the switch piston 64, thereby extending the tension spring 68; if the displacement is great enough the pressure exerted by the spring 68 will cause the switch piston 64 to move upwards in the cylinder 59, but at a very slow rate which is regulated by the flow of the oil submerging the piston 64 from the upper to the lower side of the latter through the opening 65. As the piston 64 rises the contact points 74 on the flange 73 thereof, will make contact with the annular electrical ring terminal 60 and ground the circuit and energize the air inlet control valve 36$^a$, which is thereby opened and air is supplied to the cylinder 8 of the device, until the pressure is great enough to balance the load supported on the piston 4 causing the latter to rise, and as it approaches its normal position of suspension the tension on the spring 68 is relaxed. As the piston 4 rises the switch piston 64 which is now above its normal relative position in the cylinder 59 is forced downwards therein by the action of the compression spring 72, thus forcing the contact points 74 away from the terminal 60 and breaking the electrical circuit to the air control inlet valve and so closing the latter.

When the load supported statically on the piston 4 is reduced and the air pressure in the cylinder 8 of the device is greater than that required to balance the load and maintain the piston 4 in its normal position of suspension, the latter will be forced upwards, carrying with it the switch piston 64 which will compress the spring 72; if the displacement of the piston 4 in the cylinder 8, is sufficient the pressure of the spring 72 will cause the switch piston 64 to move downwards in the cylinder 59 slowly, until the contact points 74 on the piston 64 will touch the annular electrical terminal 61 and close the electric circuit, by grounding the same through the pistons 64 and 4, thereby energizing the air outlet valve 36$^b$, permitting air to be released from the cylinder 8 to the atmosphere, until it is reduced enough to balance the load supported on the piston 4 causing the latter to fall, and as it approaches its normal position of suspension the pressure on the spring 72 is relaxed; if the switch piston 64 is below its normal relative position in the cylinder 59, as the piston 4 approaches its normal position of suspension, it is forced upwards therein by the action of the tension spring 68 thus forcing the contact points 74 away from the terminal ring 61 and breaking the electrical circuit to the air outlet valve and thereby closing the latter.

As the vehicle travels on the road and the piston 4 oscillates up and down in cylinder 8 due to obstacles met with thereon; when the piston 4 is forced below its normal position in the cylinder 8 against the pressure of air contained therein, the spring 68 will be extended due to the resistance of the piston 64 to movement in the cylinder 59, by the rod 70 and head 71 which engages with the piston 64 and the collar 69 of the spring 68. The compression spring 72 is then free to slide down the outside of the guide tube 67. Owing to the short duration of the displacement due to the vibration, the tension spring 68 cannot move the piston 64 in the cylinder 59 against the resistance caused by the damping of the passage of the oil from one side of the piston to the other through the opening 65, enough to close the electrical circuit through the contact points 74 and the electrical terminals of the air inlet valve.

Similarly, when the piston 4 oscillates above its normal position of suspension in the cylinder 8 the spring 72 will be compressed due to the resistance of the piston 64 to movement, the rod 70 will rise upwards through and in the collar 69 of the spring 68; owing to the short duration of the displacement there is no time for the piston 64 to move enough in its cylinder 59 to permit the electrical circuit to the air control outlet valve being closed and so the valve remains closed.

By the above arrangement and operation only changes in the load supported by the piston 4 actuates and regulates the supply of air through the air inlet and outlet valves to maintain the piston in its normal position of suspension.

It is necessary that the strength of the tension spring 68 shall be such that when extended it will not raise the piston 64 in its cylinder 59 and form a vacuous space below the same.

It is also to be understood that the above described switch is not limited in its disposition to that shown in the drawings, and may be placed in other positions and actuated by the relative movement of the piston and cylinder of the device without departing from the scope of this invention.

Referring to the fluid pressure brake parts, it is obvious that a piston and cylinder with suitable packing may be substituted as a mechanical equivalent in lieu of the chamber and flexible diaphragm herein shown in connection with the figures of the drawings and described, without departing from the ambit and scope of the invention.

What I claim is:—

1. In a pneumatic anti-vibration device for automobiles of the type set forth an axle, the outer ends of which are each adapted to receive a piston, an upright non-rotatable piston detachably secured to the outer end of the axle, an air cylinder vertically reciprocatable and horizontally constrained and guided thereon, a steering yoke vertically journalled on and carried by the cylinder, a wheel carried by and journalled on the yoke, in or adjacent to the plane of the piston and co-operating cylinder in combination with means for braking the wheel, comprising, a hollow wheel adapted to pass over and surround the device and support at its outer periphery a rim and tire, the inner peripheral surface forming a brake drum, brake shoes, a fluid pressure chamber having an actuating element co-operating therewith, a connecting member disposed over the said chamber carried by the yoke, adapted to engage with the actuating element therein, and the brake shoes and be guided and carried by the yoke and in the plane of the wheel, means disposed on the vehicle for the supply and control of the fluid pressure in the chamber to actuate the brake and spring means disposed and adapted to free the brake when the pressure in the chamber is released.

2. In a pneumatic anti-vibration device for automobiles of the type set forth, including a cylinder and piston, means for maintaining a supply of air under pressure thereto and electro-magnetically operated means controlling the supply of air to and the escape from the cylinder of the device, the combination therewith of electric switches, adapted to control the supply of electricity to the said control means, disposed and arranged to be operated by the relative movement of the piston in the cylinder of the device, due to variations of the load supported therein, comprising a switch piston and co-operating cylinder attached respectively to the elements of the device, terminals attached to the switch cylinder in electrical communication with the respective control means, and a terminal attached to the switch piston in electrical communication with the source of electricity so arranged and adapted that when the switch piston is moved the required amount from its normal position in its cylinder it will engage with one or the other terminal therein and actuate the respective control means, compression and tension springs and guiding elements adapted to be in sliding engagement therewith when the said springs are respectively free from stress, disposed between one element of the device and the switch piston arranged and adapted to maintain the switch piston in a normal predetermined position relative to the said element of the device so that when variations in the load displaces the piston therein one of the respective circuits is closed and the control means actuated, fluid disposed in the switch piston and cylinder, an opening arranged therein to permit the passage of the fluid therethrough for the purpose of damping the action of the valves for the purpose set forth.

3. In a pneumatic anti-vibration device for automobiles of the type set forth, including a cylinder and piston, means for maintaining a supply of air under pressure and electro-magnetically operated control means controlling the supply of air to and the escape from the cylinder of the device, the combination therewith of electric switches operated by the relative movement of the piston and cylinder of the device, due to variations in the load supported thereby, comprising a switch cylinder disposed in the upper portion of the piston in the check chamber of the device, terminals disposed therein in electrical communication with the respective control means, a switch piston operating therein in electrical communication with the source of electricity, and held in a normal predetermined position relative to the cylinder of the device, by the action of a compression and a tension spring disposed, when in this position between the top of the cylinder of the device and the switch piston, guides adapted to be in sliding engagement with the springs when the latter are respectively free from stress, means disposed on the switch piston adapted to make contact respectively with the electrical terminals of the control means, means disposed in the piston and axle sleeve arranged to automatically connect the electric circuits between the said terminals, the source of electricity and the control means, when the piston is secured endwise to the axle, liquid disposed in the switch piston and cylinder and means permitting the liquid to pass from one side to the other of the piston for the purpose of damping the movement therein and the action of the valves for the purpose set forth.

4. In a pneumatic anti-vibration device for automobiles of the type set forth, including a cylinder and co-operating piston oscillated by the respective movements of a wheel hub and companion axle, an opening in the lower face of the piston, a ferrule attached to the lower end of the cylinder adapted to telescope with the opening in the piston, a dash-pot chamber disposed adjacent to and in communication with the annular space between the ferrule and cylinder, and means accessible from the inside face of the wheel for replenishing liquid to the cylinder and adapted when sealed to form an air and liquid dash-pot to check the movement of the piston in the cylinder thereof.

5. In a pneumatic anti-vibration device for automobiles of the type set forth, an axle, the outer ends of which are each adapted to receive a piston, an upright non-rotatable piston detachably secured to the outer end of the axle, a co-operating air cylinder reciprocatable on the piston and means attached thereto in sliding engagement with the axle therein, adapted to restrain the cylinder from horizontal rotation thereon, bearings, disposed on and carried by the cylinder, a horizontally rotatable yoke, journaled on the bearings, with an outwardly extending arm, forming part of the elements of the steering means, wheel bearings mounted on the yoke arm, a hollow wheel disposed in or adjacent to the plane of the piston and cooperating cylinder, the hub of which is journaled on the wheel bearings, adapted to pass over and surround the device and support at its outer periphery a rim and tire, means attached to the yoke and to the steering means disposed on and in connection with the vehicle and means for maintaining the opening in the cylinder dust free.

6. In a pneumatic anti-vibration device for automobiles of the type set forth, an axle, the outer ends of which are each adapted to receive a piston, an upright non-rotatable piston, detachably secured to the outer end of the axle, a co-operating air cylinder reciprocatable on the piston and means, comprising, an inwardly extending hollow arm, attached to the cylinder, enveloping and in sliding engagement with the axle therein, adapted to restrain the cylinder from horizontal rotation thereon, pivotal bearings disposed and carried on the upper and lower faces of the cylinder ends, a horizontally rotatable yoke, forming part of the elements of the steering means, adapted to envelope the outer portion of the cylinder, journaled on the bearings, wheel bearings mounted on the yoke arm, a hollow wheel disposed in or adjacent to the plane of the piston and cooperating cylinder adapted to pass over and surround the device and support at its outer periphery a rim and tire, the hub of which is journaled on the wheel bearings, means securing the piston endwise on the axle, and means for maintaining the opening in the cylinder dust free, comprising, an annular dust tube detachably secured to the axle engaging the outer wall of the cylinder and inside wall of the yoke through dust washer rings attached thereto, openings through the dust tube and cylinder permitting access therethrough to the piston securing means.

7. In a pneumatic anti-vibration device for automobiles of the type set forth, an axle, the outer ends of which are each adapted to receive a piston, an upright non-rotatable piston detachably secured to the outer end of the axle, an air cylinder vertically reciprocatable and horizontally constrained and guided thereon, a steering yoke, vertically journaled on and carried by the cylinder, a wheel disposed in or adjacent to the plane of the piston and cooperating cylinder, carried by and journaled on the yoke, in combination with means for braking the wheel, comprising, a hollow wheel, adapted to pass over and surround the device and support at its outer periphery a rim and tire, the inner peripheral surface forming a brake drum, brake shoes, fulcrumed on and carried by the yoke in the plane of the wheel, a fluid pressure chamber having actuating elements cooperating therewith, comprising a flexible diaphragm, a connecting member disposed over the chamber, and means attached to the diaphragm arranged to centrally guide and transmit the vertical movement thereof to the connecting member and the brake shoes and be guided on and carried by the yoke, means disposed on the vehicle for the supply and control of the fluid pressure to actuate the brake and means disposed and adapted to free the brake when the pressure in the chamber is released.

8. In a pneumatic anti-vibration device for automobiles of the type set forth, an axle, the outer ends of which are each adapted to receive a piston, an upright nonrotatable piston detachably secured to the outer end of the axle, an air cylinder vertically reciprocatable and horizontally constrained and guided thereon, a steering yoke, vertically journaled on and carried by the cylinder, a wheel carried by and journaled on the yoke disposed in or adjacent to the plane of the piston and cooperating cylinder, in combination with means for braking the wheel, comprising, a hollow wheel adapted to pass over and surround the device, with radially extending ribs disposed on the outer periphery of the drum, adapted to receive and engage with a detachable rim and tire, the inner periphery thereof forming a brake drum, brake shoes, fulcrumed on and carried by the steering yoke adapted to operate therewith, and engaging means, means controlled on the vehicle for actuating the brake and spring means adapted to free the brake when the actuating means are released.

GEORGE WILLIAM BELL.